United States Patent
Viswanathan et al.

(10) Patent No.: US 10,505,805 B1
(45) Date of Patent: Dec. 10, 2019

(54) COMPUTING RESOURCES CHECKPOINT RESTORATION

(71) Applicant: Amazon Technologies, Inc., Seattle, WA (US)

(72) Inventors: Rajesh Viswanathan, Mercer Island, WA (US); Christopher Whitaker, Sammamish, WA (US); Tanya Bansal, Seattle, WA (US); Veeraraghavan Vijayaraj, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 15/633,462

(22) Filed: Jun. 26, 2017

(51) Int. Cl.
*H04L 12/24* (2006.01)
*H04L 12/26* (2006.01)
*G06F 9/46* (2006.01)

(52) U.S. Cl.
CPC .......... *H04L 41/0863* (2013.01); *H04L 41/08* (2013.01); *H04L 41/0853* (2013.01); *H04L 41/0856* (2013.01); *H04L 43/16* (2013.01); *G06F 9/461* (2013.01); *H04L 41/0803* (2013.01); *H04L 41/0866* (2013.01)

(58) Field of Classification Search
CPC ......... H04L 43/16; H04L 43/00; H04L 43/06; H04L 43/08; H04L 43/0823; H04L 41/22; H04L 41/12; H04L 41/0631; H04L 41/0843; H04L 41/08; H04L 41/0803; H04L 41/0681; H04L 41/0813; H04L 41/5048; H04L 41/5054; H04L 41/0866; G06F 11/30; G06F 11/3442; G06F 11/3452; G06F 2201/81; Y04S 40/162
See application file for complete search history.

(56) References Cited

U.S. PATENT DOCUMENTS

| | | | |
|---|---|---|---|
| 6,571,285 B1 * | 5/2003 | Groath | H04L 41/0631 370/352 |
| 7,386,839 B1 * | 6/2008 | Golender | G06F 11/366 717/131 |
| 8,024,440 B2 * | 9/2011 | Jibbe | H04L 41/0803 709/223 |
| 9,753,898 B1 * | 9/2017 | Glommen | G06F 17/218 |
| 9,916,551 B1 * | 3/2018 | Bandopadhyay | G06Q 10/06315 |
| 10,140,447 B2 * | 11/2018 | Rahaman | G06F 21/554 |
| 10,193,961 B2 * | 1/2019 | Frank | H04L 67/10 |
| 2002/0184065 A1 * | 12/2002 | Menard | G06Q 30/06 709/224 |
| 2003/0221094 A1 * | 11/2003 | Pennarun | G06F 9/4416 713/1 |

(Continued)

*Primary Examiner* — Alina A Boutah
(74) *Attorney, Agent, or Firm* — BakerHostetler

(57) ABSTRACT

A configuration management system may receive information defining a threshold range of deviation from a baseline configuration of at least one computing resource. The system may acquire periodic records of configuration information, from which it may be determined if the current configuration at least one computing resource has deviation from the baseline outside of the tolerated threshold. A record indicative of a prior configuration within a threshold configuration deviation may be identified. A template may be formed based on the record. The at least one computing resource may be reconfigured, based on the template, to be within the threshold configuration deviation.

20 Claims, 9 Drawing Sheets

(56) References Cited

U.S. PATENT DOCUMENTS

| | | | |
|---|---|---|---|
| 2006/0092861 A1* | 5/2006 | Corday | H04L 41/0213 370/256 |
| 2011/0040390 A1* | 2/2011 | Blevins | G05B 19/0426 700/18 |
| 2013/0212161 A1* | 8/2013 | Ben-Shaul | G06F 9/4451 709/203 |
| 2014/0149696 A1* | 5/2014 | Frenkel | G06F 12/16 711/162 |
| 2014/0247750 A1* | 9/2014 | Tapia | H04L 41/0816 370/254 |
| 2014/0365668 A1* | 12/2014 | Jaisinghani | H04L 41/0816 709/226 |
| 2017/0005865 A1* | 1/2017 | Liu | H04L 41/0843 |
| 2017/0160704 A1* | 6/2017 | Eiraku | G06F 16/23 |
| 2017/0180459 A1* | 6/2017 | Frank | H04L 67/10 |
| 2017/0201425 A1* | 7/2017 | Marinelli | H04L 41/12 |
| 2018/0212843 A1* | 7/2018 | Park | H04L 43/0876 |

* cited by examiner

COMPUTING RESOURCES CHECKPOINT RESTORATION

BACKGROUND

Increasingly, computing capacity is being provided through flexible and diverse arrangements of computing services. For example, a customer may receive, through a computing resources provider, a variety of services such as computing instances, file storage services, hosted distributed databases, and so on. In many instances, these services are assembled together to form a group of computing resources, on which one or more applications execute.

Configuring groups of computing resources may be a difficult endeavor, due at least in part to the number and complexity of the components involved. It may also be challenging to undo changes made to the configuration of the group of computing resources, particularly where the changes occur incrementally over a period of time.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products related to managing the configuration of computing resources. In particular, embodiments of the disclosed systems, methods, and computer program products relate to management of configuration drift in a group of related computing resources. Configuration drift may be described as deviation of the group of resources from a baseline configuration. Some degree of drift may be considered normal. Drift may, for example, occur as a result of maintenance operations performed on the computing resources, or from routine operation of the applications which execute on the computing resources. However, at times the degree of drift from the baseline may become problematic. Embodiments of the systems, methods, and computer program products described herein may detect when computing resources are in a configuration whose amount of deviation has exceeded a configuration deviation threshold. Embodiments may, moreover, take corrective action by reconfiguring the computing resources to a previous point in which the computing resources were within the configuration deviation threshold.

In an embodiment, a system comprises at least one processor and a memory. The memory has stored thereon machine-readable instructions which, if performed by the processor, cause the system to determine that the computing resources are in configuration which exceeds a configuration deviation threshold.

In an embodiment, the instructions, when performed by the processor, cause the system to respond to the determination by generating a template indicative of reconfiguring the computing resources to be within the configuration deviation threshold. In an embodiment, the template is formed based at least in part on configuration data for computing resources that corresponds to an earlier configuration that was within the configuration deviation threshold. In an embodiment, the template is formed based on properties of the earlier configuration that are associated with a supplied definition of the configuration deviation threshold.

In an embodiment, the instructions, when performed by the processor, cause the system to reconfigure the computing resources based on the template. Once configured according to the template, the configuration of the computing resources is within the configuration deviation threshold. In an embodiment, the system identifies reconfiguration actions needed to bring the computing resources into conformance and causes those instructions to be performed.

Figure 1:
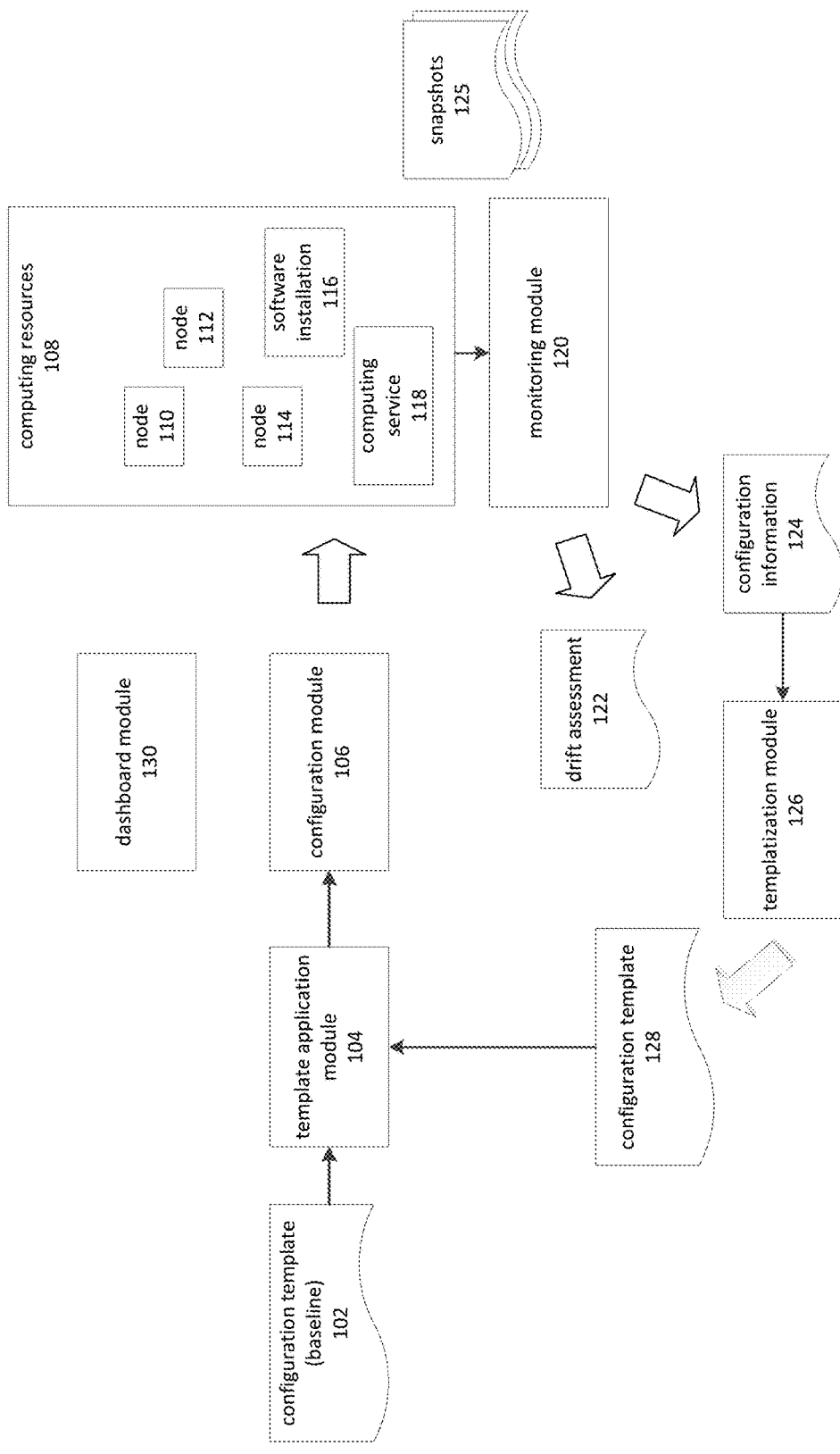
FIG. 1 is a block diagram depicting an embodiment of a configuration management system.

FIG. 1 is a block diagram depicting an embodiment of a configuration management system. In the depicted embodiment, a configuration management system 100 may comprise computing resources 108 whose configuration is maintained by the depicted template application module 104, configuration module 106, monitoring module 120, and templatization module 126.

In an embodiment, computing resources 108 may comprise one or more computing resources in a configuration that provides a computing service or performs a computing function. The configurations of each of the computing resources 108 may be interrelated—for example one of the computing resources 108 might host a database and another one of the computing resources 108 might host an application which relies on the database. A computing resource, as used herein, may refer to a computing node 110-114, software installation 116, computing service 118, and so forth. Other examples of computing resources, not explicitly depicted in FIG. 1, include storage devices, network devices, and so forth. The computing resources 108 may include one or more of computing resources such as these. The computing resources 108 may further comprise an arrangement of the resources. For example, the computing resources 108 might include a network connecting the depicted nodes 110-112. Similarly, the computing resources 108 might comprise a particular configuration of the computing service 118. It will be appreciated that the provided examples are meant to be illustrative, and thus should not be construed so as to limit the scope of the present disclosure to only those particular arrangements depicted in FIG. 1 or described here. The depicted computing resources 108 may, more generally, be seen as comprising an arrangement or group of computing resources. The computing resources 108 may sometimes be referred to as a stack of computing resources.

In an embodiment, such as the embodiment depicted in FIG. 1, the configuration of computing resources 108 may be described in a configuration template 102. The configuration template 102 may comprise a description of properties of the computing resources 108 and/or properties of the computing resources 110-118.

In an embodiment, a template application module 104 interprets the configuration template 102 to identify the configuration properties specified by the configuration template 102. Based on the identified configuration properties, the template application module 104 may then provide instructions to the configuration module 106. Based on the instructions, the configuration module 106 configures the computing resources 108, such that the resulting configuration conforms to the template.

In an embodiment, a configuration template 102 may be indicative of a baseline configuration from which no more than a user-defined amount of configuration drift is desired. In an embodiment, the baseline configuration is associated with a configuration deviation threshold. This may define the maximum amount of drift that is considered permissible. A configuration deviation baseline, accordingly, may be indicative of a tolerated amount of drift, a permissible amount of drift, and so on. The configuration template 102 may include information specifying the permissible amount of drift for the configuration properties it specifies. For example, the template 102 might indicate that a software package must be at least of version 2.0, but not 3.0 or greater. In another example, the template 102 might indicate that at least 2 gigabytes of storage space must be available. It will be appreciated that the provided examples are meant to be illustrative, and thus should not be construed so as to limit the scope of the present disclosure to only the particular examples described herein.

In an embodiment, a monitoring module 120 obtains periodic snapshots 125 of configuration data for the computing resources 108. The snapshots may, for example, be obtained periodically or in response to certain operations, such as hardware or software installations. A snapshot may contain configuration information for the computing resources 108.

In an embodiment, a snapshot corresponds to one or more images or backup copies of data maintained on or pertinent to the components 110-118 of the computing resources 108. In other instances, the snapshot may comprise metadata or other information indicative of the configuration of the components 110-118 of the computing resources 108, and/or of the computing resources 108 as a whole. In an embodiment, the data in a snapshot is a superset of configuration properties described in a template. Thus, the snapshot may contain a plurality of configuration properties, some of which may be pertinent to the configuration properties specified in a template, and some of which may be extraneous to the template.

In an embodiment, the monitoring module 120 examines snapshots 125 to produce a drift assessment 122. The drift assessment 122 may comprise indications of the degree to which the configuration of the computing resources 108 has deviated from the specifications of the baseline template 102. The drift assessment 122 may further comprise indications of the degree to which the drift is tolerated. For example, certain configuration properties specified by the baseline template 102 may be considered critical, and no deviation permitted, while other deviations may be considered undesirable but not critical. In an embodiment, a numerical score or grade letter is assigned to indicate the degree of drift. In an embodiment, an administrative user of the computing resources may assign a threshold value to indicate what degree of drift is tolerated.

In an embodiment, the monitoring module 120 determines that a current configuration state of the computing resources 108 is indicative of an impermissible amount of drift, for example as may be indicated by a drift assessment 122. In other words, the amount of drift is outside of the tolerated range. In response to the determination, the monitoring module 120 may identify and select suitable configuration information 124. The configuration information may sometimes be referred to as a snapshot. The identified configuration information 124 may correspond to a configuration of the computing resources 108 in which the level of drift was permissible. This may, in some instances, be configuration information recorded just after the computing resources 108 was configured according to the baseline template 102.

In an embodiment, a templatization module 126 processes the configuration information 124 to produce a configuration template 128. The configuration template 128 may comprise a description of desired properties for the computing resources 108 and/or properties of the computing resources 110-118.

In an embodiment, the configuration template 128 produced by the templatization module 126 may be equivalent to the baseline configuration template 102. However, in some cases it may differ from the baseline configuration template 102. For example, there may be some deviation between certain properties specified by the configuration template 128. Still, even though the properties may be different, the configuration indicated by the new template 128 may be within the tolerated amount of drift. For example, the new template 128 might specify an upgrade of a software version from 2.0 to 2.3, where the acceptable drift of the software version is for any version greater than 2.0 but less than 3.0. It will be appreciated that this example is intended to be illustrative, and as such should not be construed so as to limit the scope of the present disclosure to only this particular example.

In an embodiment, the template application module 104 receives the configuration template 128. Next, in conjunction with the configuration module 106, a configuration compatible with the configuration template 128 is applied to the computing resources 108. Once the process is complete, the computing resources 108 may be within the tolerated amount of drift.

In an embodiment, the template application module 104 translates templates 102, 128 to instructions for reconfiguring the computing resources 108. The configuration module 106 may coordinate execution of the instructions, causing the computing resources 108 to be reconfigured.

In an embodiment, the instructions may include allocating hardware, creating virtual computing nodes, applying virtual machine images, configuring network settings, recording configuration information in log files, executing software installation programs, and so forth.

In an embodiment, the template application module 104 may identify instructions for reconfiguring the computing resources 108 based on a goal-seeking algorithm. The algorithm may comprise identifying one or more operational steps that, when executed, would result in the computing resources 108 being configured in accordance with the permissible level of risk. In an embodiment, the set is selected based on factors which may include time-to-completion, risk, and degree of expected drift compliance.

Figure 2:
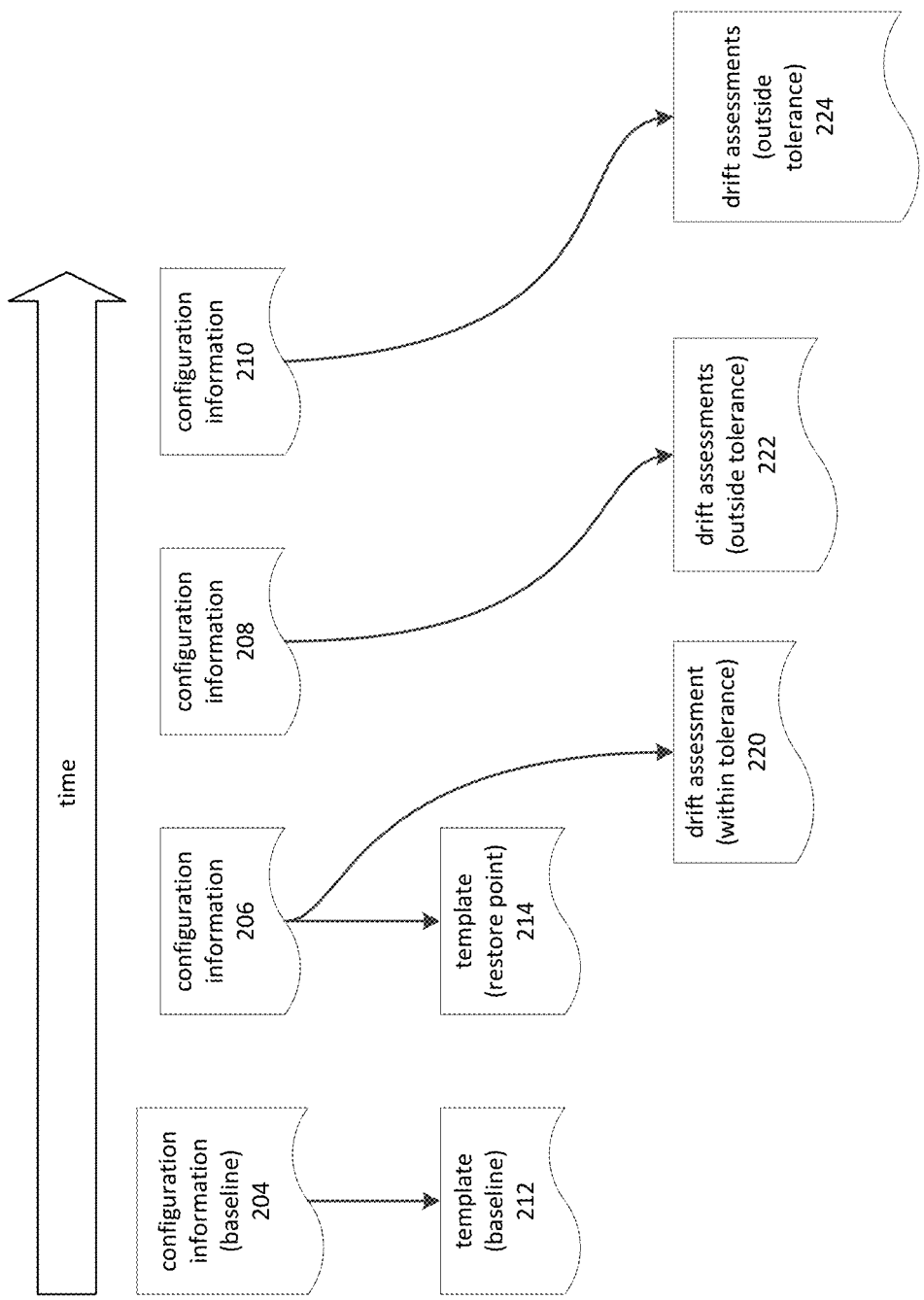
FIG. 2 is a block diagram depicting an embodiment of a process for identifying drift in a group of computing resources.

FIG. 2 is a block diagram depicting an embodiment of a process for identifying drift in a group of computing resources. In an embodiment, a drift identification process 200 may be performed over time. The drift identification process 200 may comprise regular assessments of configuration drift that may accumulate over time.

In an embodiment, configuration information 204-210 for of a group of computing resources is obtained on a periodic basis. The configuration information may be referred to as a snapshot. The period may be any value sufficient to record configuration information with suitable granularity. An administrative user may specify the frequency or it may be determined by a computing services provider. For example, the monitoring module 120 of FIG. 1 might determine the frequency based on a rate of change for the computing resources configuration.

In an embodiment, each of the configuration information records 204-210 are taken reactively, which is to say in response to events which may occur on the computing resources. For example, a record of the configuration information for a computing node might be taken following any changes to the configuration of the computing resources.

In an embodiment, the computing resources are configured according to a template 212 which defines a baseline configuration. The template 212 may also include, or otherwise be associated with, information which defines a tolerated amount of drift with respect to the baseline configuration defined by the template 212.

In an embodiment, drift assessments 220-224 may be produced, for example by the monitoring module 120 depicted in FIG. 1. The drift assessments 220-224 may comprise information derived from comparing properties defined by the baseline template 212 to the properties of the computing resources. The monitoring module 120 may evaluate these properties with respect to the ranges or other criteria associated with a tolerated amount of drift. If the properties do not conform to these criteria, the monitoring module 120 may determine that the current configuration of the computing resources has an impermissible amount of drift.

In an embodiment, the drift assessments are be based on a comparison between the configuration represented by baseline configuration information 204 or a template 212 that was derived from the baseline configuration information 204. Note that although FIG. 2 depicts the drift assessments 220-224 being based on the configuration information records 206-210, embodiments may, in some cases, base the drift assessments 220-224 on a corresponding template. In another embodiment, the drift assessments 220-224 are based on direct inspection of the computing resources. Note that the drift assessment may be performed with respect to a subset of possible configuration properties, specifically those whose ranges or other constraints are included in the definition of tolerable drift. Configuration properties not included in this definition may be ignored.

As depicted in the example embodiment of FIG. 2, the amount of drift may increase over time 202. Thus, more drift may be identified in the configuration recorded in a later record of configuration information 210 than in an earlier record of configuration information 206. Thus, it may be the case that these the later records 208, 210 represent configurations with drift outside of the tolerable range.

In an embodiment, the computing resources may be restored to a previous point in time. Embodiments may perform a point-in-time restoration of a configuration based on an examination of the drift assessments 220-224. For each of the drift assessments 220-224, the examination may comprise evaluating, for the relevant configuration properties, whether or not the configuration properties are indicative of drift from the baseline and, if so, how much drift is indicated. The point in time restore may be applied using a record of configuration information whose drift amount is within an acceptable range. By way of example, assume that in FIG. 2 the final two drift assessments 222, 224 indicate an unacceptable amount of drift, but that an earlier assessment 220 does not. That being the case, the point-in-time restore may be based on the corresponding configuration information record 206. The point-in-time restore might also be based on the baseline configuration information record 204, since by definition it is associated with a zero amount of drift.

In an embodiment, a template 214 may be formed using the selected record of configuration information. The template 214 may comprise information indicative of the configuration properties of the computing resources at the selected restoration point. The properties included in the template 214 may be those included in the definition of the tolerated amount of drift. Additional properties may also be included. In an embodiment, the additional properties may comprise properties of a later configuration that are to be retained subsequent to the restoration. In an embodiment, then additional properties may comprise properties related to those that are specified.

In an embodiment, the template 214 is formed by a templatization module 104 as described above. The template 214 is then sent to a template application module 104, and then applied, by a configuration module 106, to the computing resources.

Figure 3A:
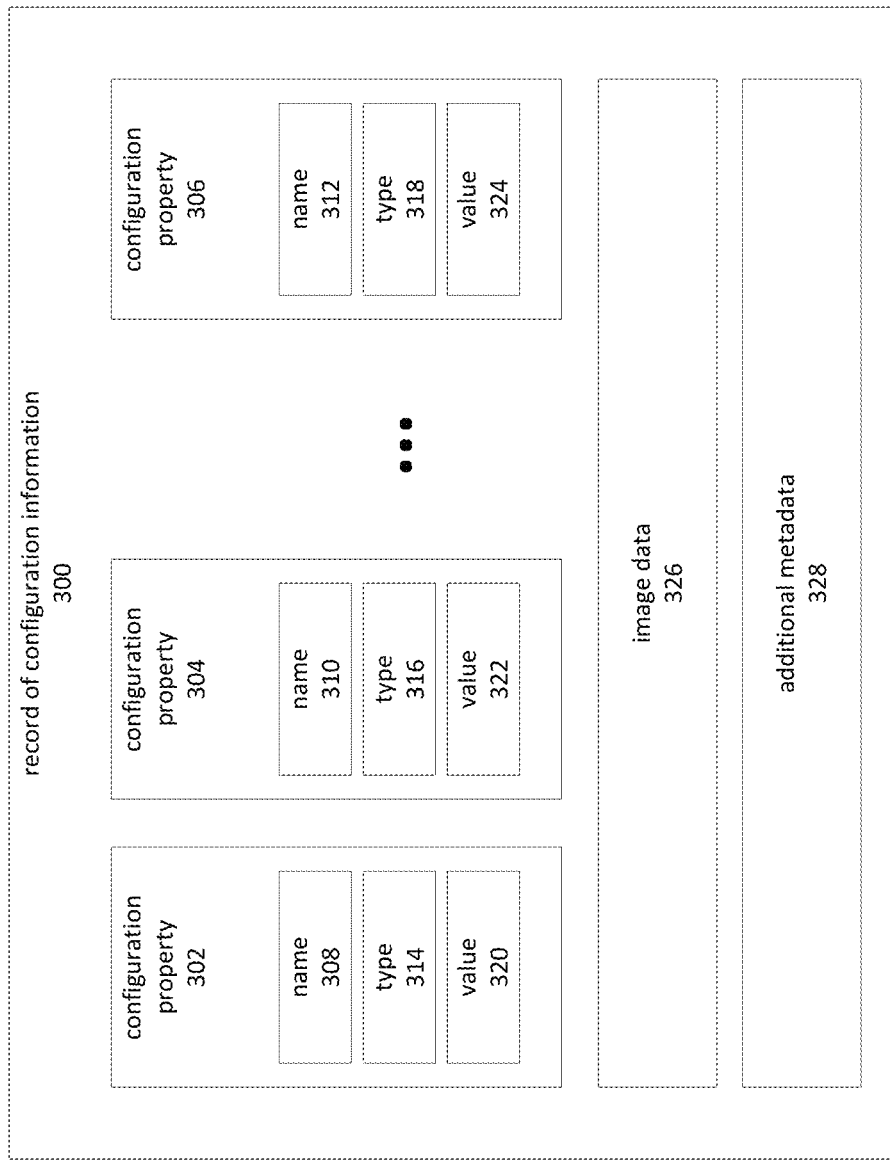
FIG. 3A is a block diagram depicting an embodiment of a configuration snapshot.

FIG. 3A is a block diagram depicting an embodiment of a record of configuration information, sometimes referred to as a snapshot. In an embodiment, a configuration information record 300 may comprise configuration properties 302-306. In an embodiment, each of the configuration properties 302-306 comprises a name component 308-312, a type component 314-318, and a value component 320-324. The name component 308-312 identifies the configuration property. The value component 320-324 provides a value for the configuration property. The type component 314-318 provides information facilitating the processing of the value component 320-324, or otherwise assists in interpreting the information provided by the configuration property 302-306.

In an example, a property 302 might comprise a name component 308 of "application version," a value component 320 of "2.2," and a type component 314 of "VERSION_MAJOR_DOT_MINOR." It will be appreciated that this example is intended to be illustrative. As such, the example should not be construed in a manner that would restrict the scope of the present disclosure to only those examples provided.

Figure 3B:
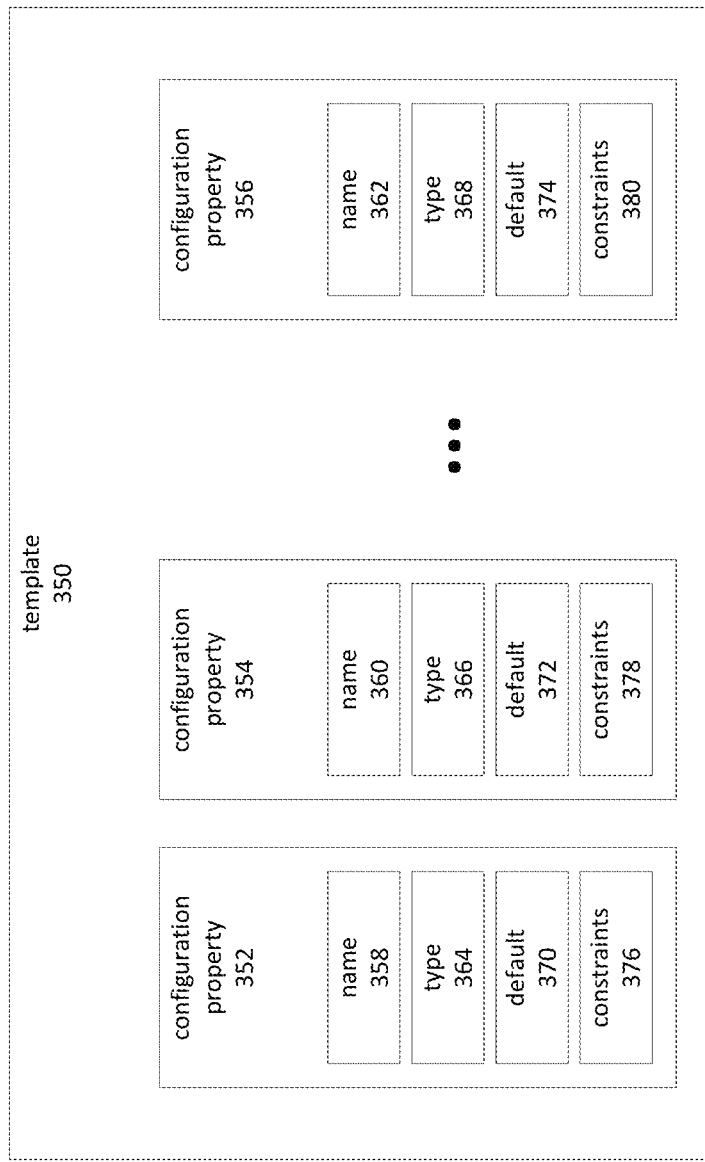
FIG. 3B is a block diagram depicting an embodiment of a configuration template.

A configuration information record 300 may, in an embodiment, be a relatively thorough representation of the current configuration state of a corresponding computing resources, compared to a configuration template 350, as depicted in FIG. 3B. As such, the configuration properties 302-306 that are included in the configuration information record 300 may be more numerous than what might be found in a template 350 that was based on the configuration information record 300, since in the embodiment the configuration properties specified in the template 350 may be those considered pertinent to the definition of a tolerated amount of drift.

In an embodiment, the configuration information record 300 also comprises additional data, including image data 326 and additional metadata 328. The image data 326 may, for example, comprise backup copies of data, backup copies of virtual machine disks, backup copies of storage devices, and so forth. The additional metadata 328 may include other information not represented by the configuration properties. The information may, for example, include information describing when the snapshot was taken, what baseline the snapshot may be compared against, and so forth. It will be appreciated that these examples are intended to be illustrative, and as such should not be construed in a manner which would restrict scope of the present disclosure to only the specific examples provided.

In an embodiment, the configuration information record 300 is generated by serializing configuration information for each of a plurality of components of a group of at least one computing resource. For example, a computing resource such as a computing node might host a web server and a database. Each of these components might in turn comprise various sub-components. The configuration information for the computing resource might be generated, in an embodiment, by serializing configuration information for each of the components and sub-components.

In an embodiment, the configuration information record 300 is generated by serializing the configuration data to JAVASCRIPT Object-Notation ("JSON") format. The components of the computing resources may be signaled to generate JSON representations of their configuration data, and this data in turn may be assembled into a complete snapshot of the configuration information 300.

FIG. 3B is a block diagram depicting a configuration template. In an embodiment, a configuration template 350 is specified by an administrative user or derived from a record of configuration information 300. A baseline template, for example, may be provided by an administrative user. Other templates may be formed by a templatization module 126, based on a configuration baseline, when an excessive amount of drift is detected.

In an embodiment, the configuration template 350 may comprise a number of configuration properties 352-356. Each of the properties 352-356 may comprise a name component 358-362, a type component 364-368, a value component 370-374, and a constraint component 376-380. The name components 358-362, type components 364-368, and value components 370-374 may correspond to those of the configuration information record 300. The constraints components 376-380 may be indicative of a range of permissible or tolerated values for the corresponding configuration property 352-356.

In an embodiment, a constraint may be specified as a list of values. In another embodiment, a constraint may be specified using regular expressions or some other pattern language. In another embodiment, a constraint may be specified as a numeric or alphabetical range. It will be appreciated that these examples are intended to be illustrative, and as such should not be construed in a manner which would restrict scope of the present disclosure to only the specific examples provided.

In an embodiment, generating the configuration template 350 comprises scanning the configuration information record 300 for properties referenced in a definition of a threshold amount of deviation. The configuration deviation threshold may be defined as a set of one or more properties, each having an associated range of permitted values or an indication that the properties presence or absence is indicative of being within the threshold amount of deviation. As the record 300 is scanned, properties in the snapshot which are also referenced by the definition of the configuration deviation threshold may be noted.

In an embodiment, generating the configuration template 350 may further comprise determining if the snapshot represents a configuration that falls within the configuration deviation threshold. For each property referenced in the definition of the threshold, the property's value may be compared to the value indicated in the snapshot. If the values of the property conform to the ranges, it may be determined that the snapshot that falls within the configuration deviation threshold.

In an embodiment, generating the configuration template 350 may further comprise incorporating properties from a conforming configuration information record 300 into the template 350. The template may be generated to include those properties which are both referenced in the definition of the configuration deviation threshold and which are present in the configuration information record 300. Thus, the template 350 may be generated to correspond to a subset of the snapshot which comprises properties referenced by the definition of the threshold. Moreover, the template 350 may be generated such that the values of those properties, as specified in the template 350, correspond to those of the configuration information record 300.

In an embodiment, generating the configuration template 350 may further comprise adding additional properties to the template 350. In an embodiment, the additional properties are obtained from a secondary snapshot. For example, the additional properties might be obtained from a snapshot of the current configuration. The current configuration might fall outside of the configuration deviation threshold, but might nevertheless possess a property that the user wishes to preserve. In an embodiment, the configuration template 350 is formed based on a combination of a conformant configuration information record 300 and one or more additional properties from other templates.

Figure 4:
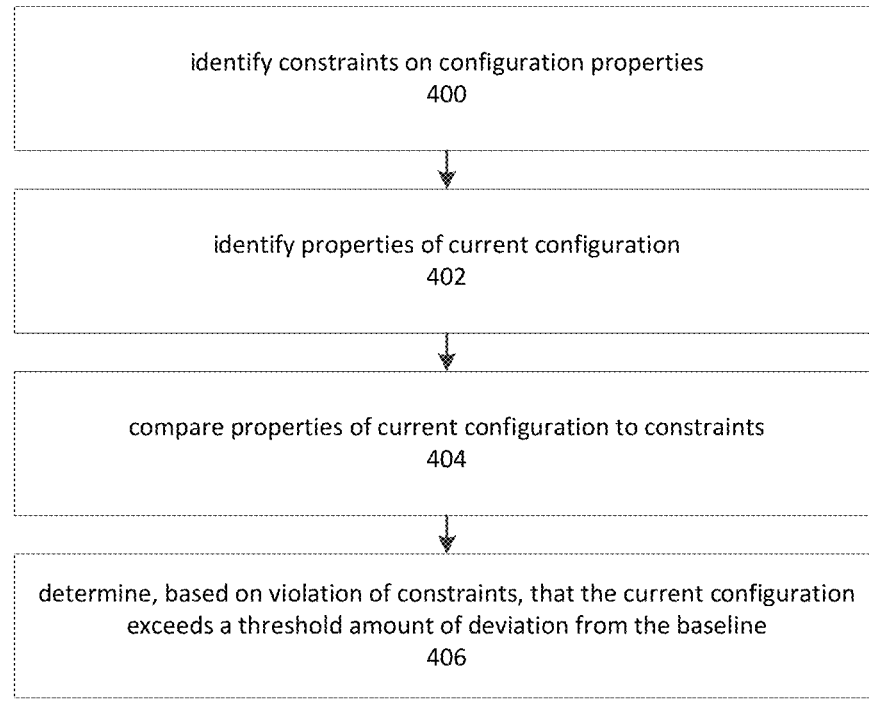
FIG. 4 is a flow diagram depicting an embodiment of a process for determining whether a group of computing resources has more than a tolerated amount of deviation from a configuration baseline.

FIG. 4 is a flow diagram depicting an embodiment of a process for determining whether a group of computing resources has more than a tolerated amount of drift from a configuration baseline. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 400 depicts identifying constraints on the configuration properties. As depicted by FIG. 3B, in certain embodiments may identify constraints to configuration properties via a template 350. In some embodiments, metadata associated with the baseline configuration information record 300 may provide constraint information. In some embodiments, constraint information is provided with reference to a baseline. For example, a constraint might indicate that the version of an installed application program must be no less than the version number of the application program on the baseline configuration.

Block 402 depicts identifying the properties of a current configuration. This information may, as depicted in FIG. 2, be extracted from a snapshot of the current configuration. Then, at block 404, the properties of the current configuration may be compared to the corresponding constraints.

Block 406 depicts determining, based on violations of those constraints, whether or not the current configuration exceeds a tolerated range of deviation from the configuration baseline. In an embodiment, the tolerated range of deviation may be defined as there being no specified constraint which has been violated. In another embodiment, constraint violations are quantified and compared against a threshold value. For example, each constraint might be associated with a point value. A sum of these values may then be compared to a threshold value. If the value is exceeded, the configuration may be viewed as being outside the tolerated range of deviation.

Figure 5:
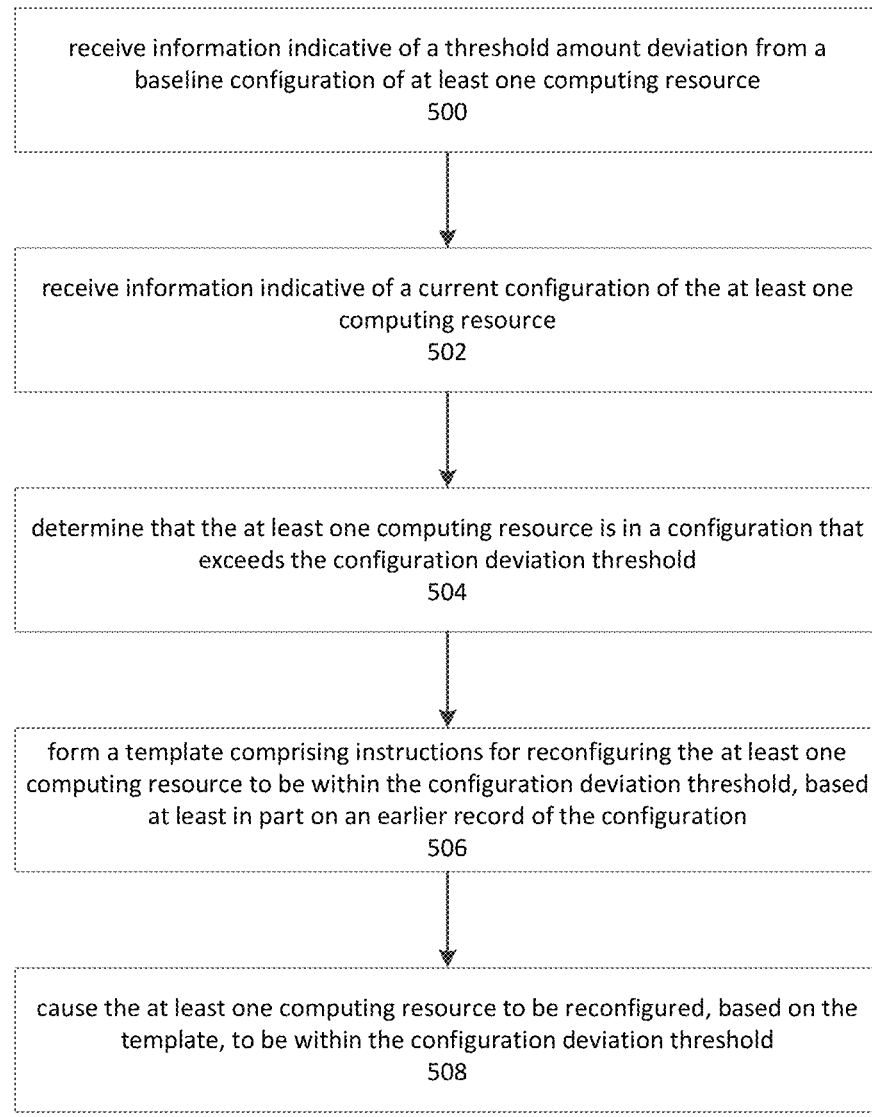
FIG. 5 is a flow diagram depicting an embodiment of a system that restores the configuration of a group of computing resources.

FIG. 5 is a flow diagram depicting an embodiment of a system that restores the configuration of a group of computing resources. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts receiving information indicative of a threshold amount of deviation from a baseline configuration of at least one computing resource.

In an embodiment, an administrative user may specify a baseline configuration. In an embodiment, the administrative user authors a configuration template. The configuration template may include information specifying constraints on various configuration properties and a definition of what constitutes the threshold amount of configuration deviation.

In an embodiment, a baseline configuration of the at least one computing resource corresponds to a configuration template provided by the administrative user.

In an embodiment, an administrative user may specify a point in time as a reference point for a baseline. For example, the administrative user might indicate that the current configuration constitutes a baseline. The configuration as of a previous time might also be employed, in some instances. In an embodiment, the administrative user also provides information indicating what constitutes a threshold amount of deviation from the baseline configuration.

Block 502 depicts receiving information indicative of a current configuration of the at least one computing resource. In an embodiment, a snapshot of the configuration of the at least one computing resource is received. In an embodiment, the snapshot is received by a templatization module 126 as depicted in FIG. 1.

Block 504 depicts determining that the at least one computing resource is in a configuration that exceeds the threshold of deviation. As described herein, the determination may be based on comparing properties of the current configuration to those of the baseline, with respect to any specified constraints. A set of rules may be applied to analyze any violations of the constraints and determine if the tolerated range of deviation is exceeded. In some instances, any violation of a constraint may be considered outside the range of tolerated deviation. In other instances, violations may be quantified and compared to a threshold value. In other instances, the set of rules may be evaluated with respect to the values of the properties. This approach may permit more complex evaluations, such as permitting a constraint to be violated in some specific circumstances, but not permitting the same constraint to be violated in other circumstances.

Block 506 depicts form a template comprising instructions for reconfiguring the at least one computing resource to be within the tolerated range of deviation, based at least in part on an earlier snapshot of the configuration.

As depicted in FIG. 1, the templatization module 126 may convert snapshot information to a template. The snapshot used in the process may be selected according to various algorithms or heuristics.

In an embodiment, the snapshot is selected by examining snapshots taken prior to the current configuration. These snapshots may be evaluated to determine if they represent configurations that are within the tolerated range of deviation. The templatization module may, for example, determine that an earlier-acquired snapshot is indicative of a configuration of the at least one computing resource that is within the tolerated range of deviation. The templatization module 126 may then form the template based on this determination.

In an embodiment, a property of the current configuration is preserved, even though the configuration is outside of the tolerated range of deviation.

In an embodiment, the templatization module 126 may receive an indication that a property of the current configuration should be preserved. In an embodiment, this indication originates from a user interface provided to an administrative user. The indication might also originate from certain configuration updates obtained after the baseline. For example, a critical security update might have been deployed subsequent to the creation of the baseline. In an embodiment, a record of this deployment is kept and the deployment is preserved even though the remainder of the configuration might be restored to an earlier point. Snapshots prior to the current configuration may be examined to identify snapshots in which the desired property of the current configuration is to be found and which is within the tolerated range of deviation from the baseline property. A snapshot meeting both of these criteria may then be used to create the template.

In an embodiment, the template comprises information indicative of a plurality of configuration properties of the at least one computing resource. For example, see FIG. 3B. The template may further comprise information indicative of a permitted range of values for the listed configuration properties.

In an embodiment, the template may comprise a merger of configuration properties from two or more configurations. For example, the template might include a property from the current configuration that is to be retained when the configuration is restored to a baseline, as well as the properties associated with the baseline itself.

Block 508 depicts cause the at least one computing resource to be reconfigured, based on the template, to be within the configuration deviation threshold. In an embodiment, a template application module 104 analyzes the provided template and identifies steps for a configuration module 106 to perform.

In an embodiment, the reconfiguration comprises identifying a configuration step that, when executed, would bring the at least one computing resource into conformance with one or more of the configuration properties indicated by the template. In an embodiment, the reconfiguration comprises identifying a set of such steps, such that the properties specified by the template are conformed to.

In an embodiment, the identified steps are provided to the configuration module 106 for execution. Execution of the identified steps causes reconfiguration of the computing resources, such as imaging, software installation, network configuration, and so forth. Upon completion of the steps, it may be indicated that the reconfiguration is complete. An updated snapshot may be taken, and a new baseline created and stored. The new baseline may, for example, be stored as a template indicating updated criteria for the amount and nature of permitted drift from the baseline configuration.

Figure 6:
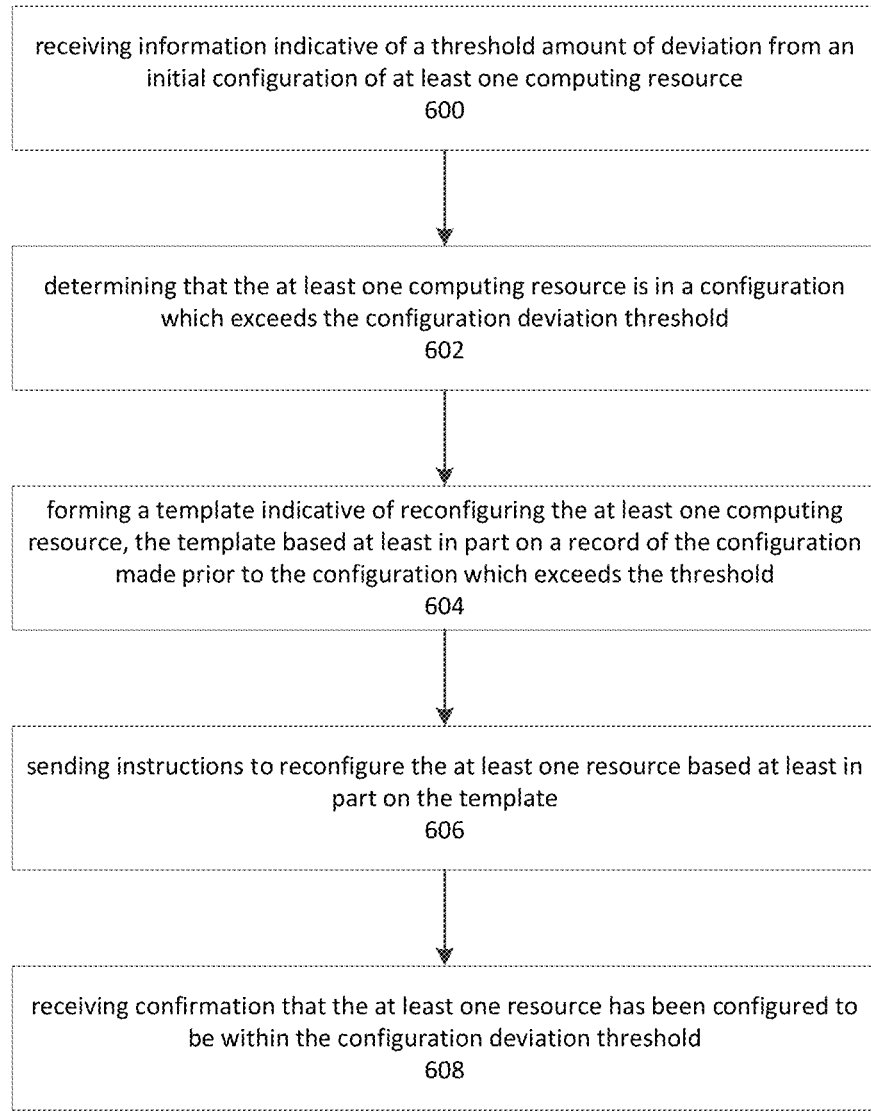
FIG. 6 is a flow diagram depicting an embodiment of a process for restoring a configuration of a group of computing resources.

FIG. 6 is a flow diagram depicting aspects of a process for restoring a configuration of a group of computing resources. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 depicts receiving information indicative of a threshold of deviation from an initial configuration of at least one computing resource. In an embodiment, the information is provided as a template, such as the template depicted in FIG. 3B, to indicate ranges of permissible values of specified configuration properties.

Block 602 depicts determining that the at least one computing resource is in a configuration which exceeds the threshold of deviation. For example, the current configuration may have been subjected to a variety of reconfiguration steps or other operations, subsequent to forming the baseline configuration, which are inconsistent with the properties of the desired configuration. Note that these properties can include a variety of attributes, including those related to available storage space, processing capability, and so on. If the current values of these properties fall outside of the indicate threshold, the configuration falls outside of the threshold.

Block 604 depicts forming a template indicative of reconfiguring the at least one computing resource, the template based at least in part on a record of the configuration taken prior to the configuration which exceeds the threshold. Block 606 depicts sending instructions to reconfigure the at least one resource based at least in part on the template.

Block 608 depicts receiving confirmation that the at least one resource has been configured to be within the threshold of deviation. A configuration module may examine the template, identify a series of configuration steps necessary to reconfigure the computing resources, and cause the series of steps to be performed. Once the steps are complete, the configuration module may provide an indication that the reconfiguration was successful.

Figure 7:
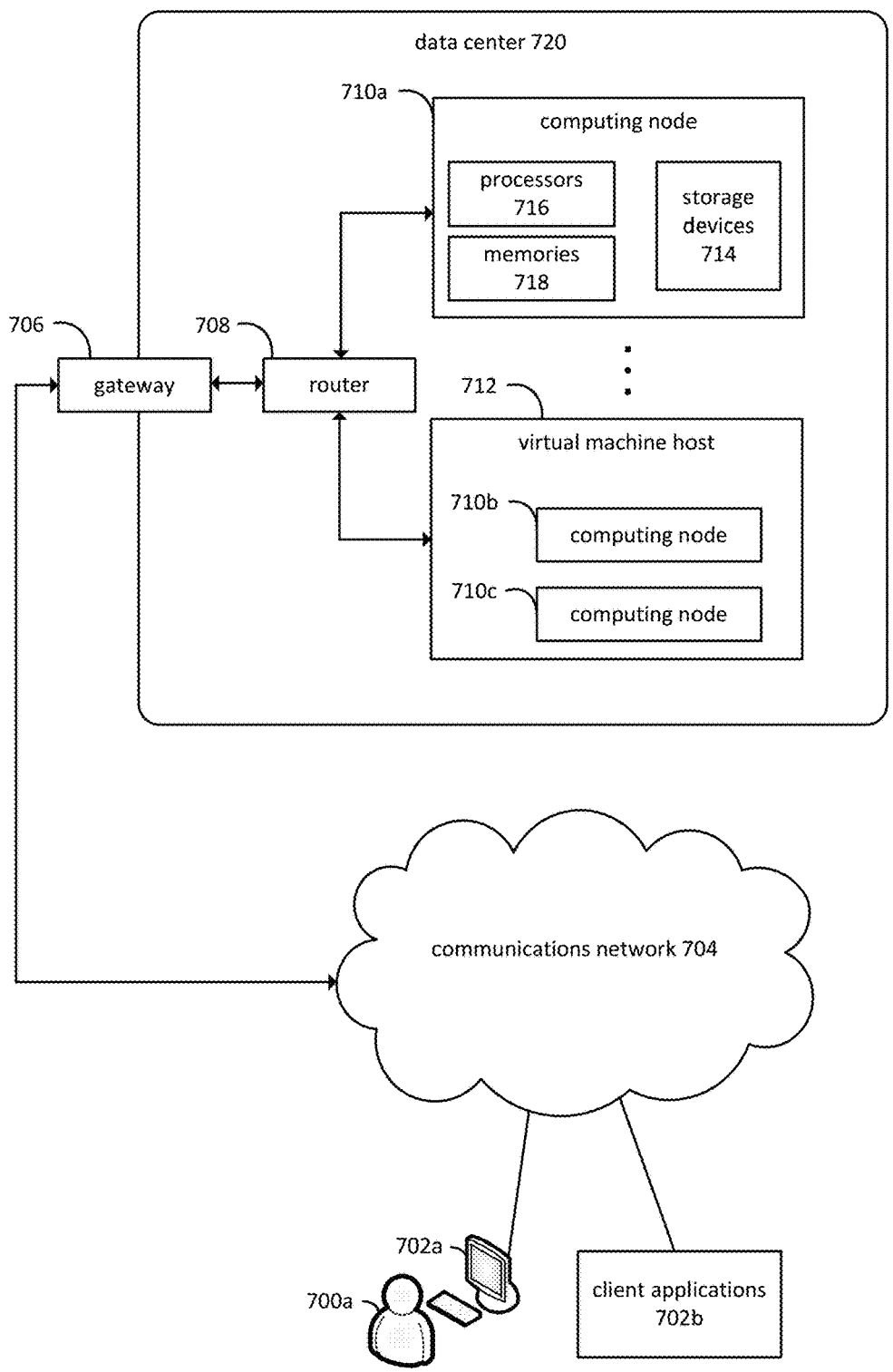
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 804 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 818, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
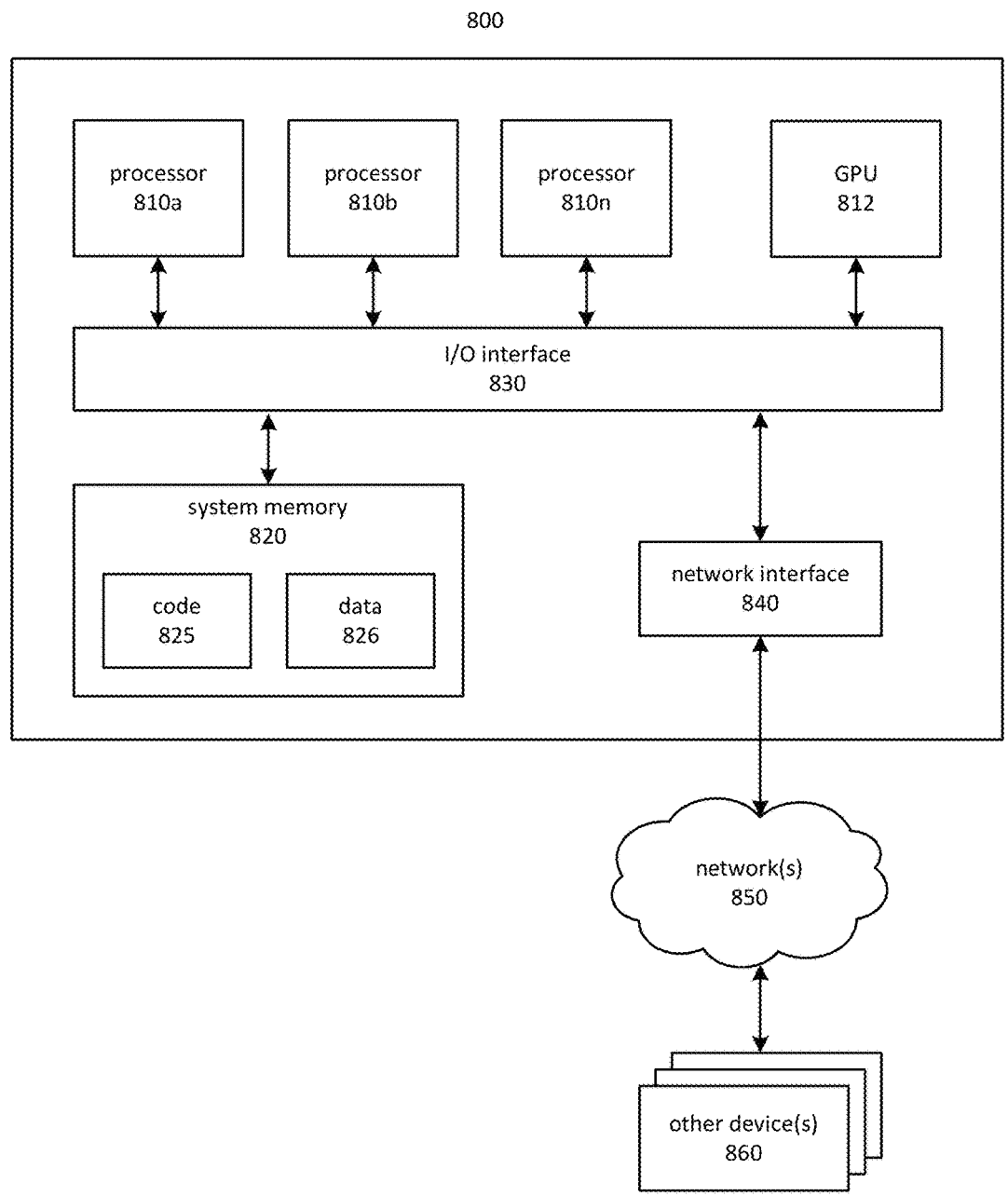
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 910. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 820 may be reconfigured by the operation of one or more of the processors 810. The processors 810 may execute the instructions of a code module and thereby reconfigure the system memory 820 to form data structures and data elements. Forming a data element may therefore refer to operations of the processor 810 to reconfigure the system memory 820. The GPU 812, network interface 840, and I/O interface may also, in some cases, form data structures by reconfiguring the system memory 820. Accordingly, the terms "form" and "forming" may also refer to the operations of these and other devices 860 which may cause the a data structure or data element to be stored in the system memory 820.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a memory to store machine-readable instructions, which if performed by a processor, cause the system at least to:
      determine whether a first configuration of at least one computing resource exceeds a configuration deviation threshold;
      generate a template to cause the at least one computing resource to be configured within the configuration deviation threshold, wherein the template is based at least in part on configuration information of the at least one computing resource prior to determining whether the first configuration exceeds the configuration deviation threshold; and
      configure the at least one computing resource based at least in part on the template.

2. The system of claim 1, the memory to store machine-readable instructions, which if performed by the processor, cause the system at least to:
   select the configuration information of the at least one computing resource for generating the template based at least in part on the configuration information being within the configuration deviation threshold.

3. The system of claim 1, the memory to store machine-readable instructions, which if performed by the processor, cause the system at least to:
   receive an indication that a property of the first configuration should be preserved; and
   select the configuration information of the at least one computing resource for generating the template based at least in part on the configuration information comprising the property of the first configuration.

4. The system of claim 1, wherein the at least one computing resource is configured by at least identifying a configuration step that, when performed, brings the at least one computing resource into conformance with a configuration property indicated by the template.

5. The system of claim 1, wherein the template comprises information indicative of a tolerated range of values for a configuration property.

6. A method, comprising:
   determining whether a first configuration of at least one computing resource exceeds a configuration deviation threshold;
   generating a template to cause the at least one computing resource to be configured within the configuration deviation threshold, wherein the template is based at least in part on configuration information of the at least one computing resource prior to determining whether the first configuration exceeds the configuration deviation threshold; and
   configuring the at least one computing resource based at least in part on the template.

7. The method of claim 6, wherein the configuration deviation threshold is defined with respect to a configuration property.

8. The method of claim 7, wherein the template is generated based at least in part on information corresponding to the configuration property that is included in the configuration information of the at least one computing resource.

9. The method of claim 6, wherein the template comprises a first configuration property associated with the first configuration and a second configuration property associated with the at least one computing resource prior to the at least one computing resource exceeding the configuration deviation threshold.

10. The method of claim 6, further comprising:
    generating the template based at least in part on a property of the configuration information of the at least one computing resource, the property conforming to the configuration deviation threshold.

11. The method of claim 6, further comprising:
    receiving information indicative of the configuration deviation threshold, the information comprising a criterion defining a range of values for a configuration property.

12. The method of claim 6, further comprising:
    receiving an indication that a property of the first configuration should be preserved; and
    selecting the configuration information of the at least one computing resource for generating the template based at least in part on the configuration information comprising the property of the first configuration.

13. The method of claim 6, further comprising:
    determining that the configuration information of the at least one computing resource is indicative of a configuration within the configuration deviation threshold.

14. The method of claim 6, wherein configuring the at least one computing resource comprises identifying a configuration step that brings the at least one computing resource into conformance with a configuration property indicated by the template.

15. A non-transitory storage medium having stored thereon machine-readable instructions that, when performed by a computing device, cause the computing device to at least:

determine whether a first configuration of at least one computing resource exceeds a configuration deviation threshold;

generate a template to cause the at least one computing resource to be configured within the configuration deviation threshold, wherein the template is based at least in part on configuration information of the at least one computing resource prior to determining whether the first configuration exceeds the configuration deviation threshold; and configure the at least one computing resource based at least in part on the template.

16. The non-transitory storage medium of claim 15, comprising further machine-readable instructions that, when performed by the computing device, cause the computing device to at least:

store a snapshot of the at least one computing resource, the snapshot comprising the configuration information of the at least one computing resource.

17. The non-transitory storage medium of claim 15, wherein the template comprises information indicative of a plurality of configuration properties of the at least one computing resource.

18. The non-transitory storage medium of claim 15, comprising further machine-readable instructions that, when performed by the computing device, cause the computing device to at least:

generate the template to comprise a first configuration property of the first configuration and a second configuration property associated with the at least one computing resource prior to the at least one computing resource exceeding the configuration deviation threshold.

19. The non-transitory storage medium of claim 15, comprising further machine-readable instructions that, when performed by the computing device, cause the computing device to at least:

selecting the configuration information for generating the template based at least in part on the configuration information being indicative of a configuration of the at least one computing resource that is within the configuration deviation threshold.

20. The non-transitory storage medium of claim 15, further comprising:

receiving an indication that a property of the first configuration should be preserved; and selecting the configuration information for generating the template based at least in part on the configuration information comprising the property of the first configuration.

* * * * *